United States Patent [19]

Righi

[11] Patent Number: 5,121,527

[45] Date of Patent: Jun. 16, 1992

[54] AUTOMATIC RELEASE DEVICE FOR SEAT BELTS ON MOTOR-VEHICLES OR THE LIKE

[75] Inventor: Nardino Righi, Milan, Italy

[73] Assignee: Eurafrica Videomatic S.r.l. Societa' per Ricerche Elettroniche ed Audiovisive, Milan, Italy

[21] Appl. No.: 674,880

[22] Filed: Mar. 26, 1991

[30] Foreign Application Priority Data

Apr. 4, 1990 [IT] Italy ............................... 12442 A/90

[51] Int. Cl.$^5$ .................................................. A44B 11/26
[52] U.S. Cl. ...................................................... 24/602
[58] Field of Search .......................... 24/602, 603, 633; 297/468, 480; 280/801, 806

[56] References Cited

U.S. PATENT DOCUMENTS

| 3,235,930 | 2/1966 | Chapin et al. | 24/602 |
| 3,855,674 | 12/1974 | Thiel | 24/602 |
| 3,952,381 | 4/1976 | Barbe | 24/602 |
| 4,126,919 | 11/1978 | Lassche | 24/602 |

FOREIGN PATENT DOCUMENTS 2650326  5/1977  Fed. Rep. of Germany ........ 24/602

*Primary Examiner*—James R. Brittain
*Attorney, Agent, or Firm*—Larson and Taylor

[57] ABSTRACT

An automatic release device for seat belts on motor-vehicles, or the like is designed to be disposed between the locking buckle (1) of the seat belt and the retaining catch (2) provided with an unlocking pushbutton (102) and secured to the frame of the vehicle. The device comprises a retaining mechanism (105) for the locking buckle (1) of the belt and, at the opposite side, a buckle (103) for engagement with the retaining catch (2). Moreover, it comprises mechanical elements (16) to cause the retaining catch (2) to open and release the device therefrom, these elements being controlled for this purpose by timing elements (8,9,R) activated by an impact and becoming operative after a pre-established time.

15 Claims, 4 Drawing Sheets

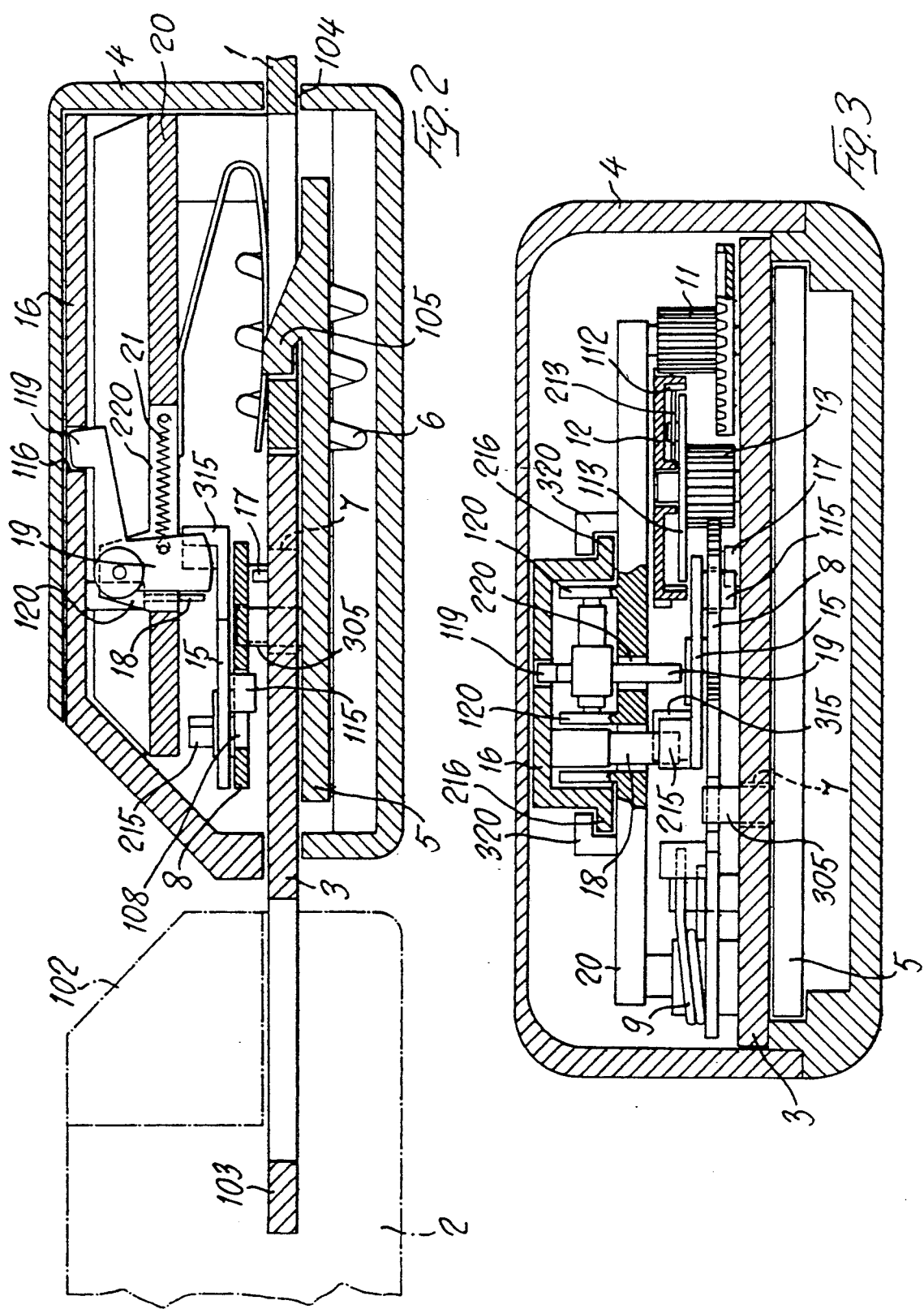

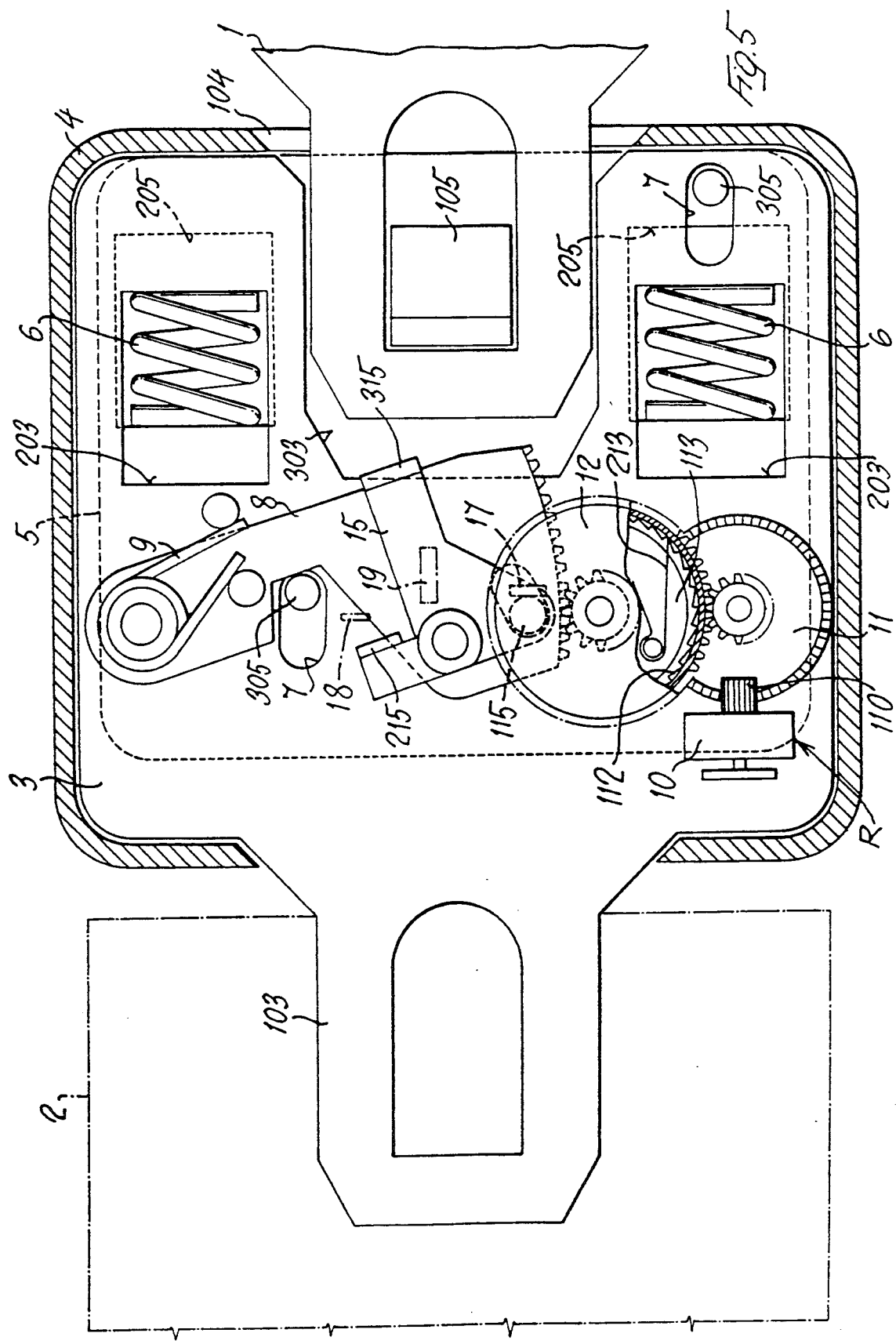

AUTOMATIC RELEASE DEVICE FOR SEAT BELTS ON MOTOR-VEHICLES OR THE LIKE

SUMMARY OF THE INVENTION

The invention relates to an automatic release device for seat belts on motor vehicles, or the like.

An object of the invention is to provide a device of the type specified above, which ensures an automatic release of seat belts after an impact and, in case of a series of consecutive impacts, only after the last impact of the series.

A further object of the invention is to provide a device of said type which, while ensuring an extremely reliable operation, is of comparatively simple and inexpensive construction.

The invention achieves this object with a device of the type described in the preamble, which is arranged between the locking buckle of the seat belt and the retaining catch provided with an unlocking pushbutton and secured to the frame of the vehicle, said device being provided with retaining means for the locking buckle of the belt and, at the opposite side, with a buckle for engagement with the retaining catch, and being provided with mechanical means to cause said retaining catch to open and release the device therefrom, said means being controlled for this purpose by timing means activated by an impact, said timing means becoming operative after a pre-established period of time.

According to a further improvement of the invention, said timing means is constructed so that, in case of a succession of impacts occurring at time intervals after each other within the lapse of time which is pre-established for said timing means to become operative, each impact of said succession of impacts causes a new countdown to start from the beginning of the pre-established period of time for said timing means to become operative.

In a preferred embodiment, the timing means comprises a lever for loading a spring, said lever being displaced angularly by an impact from a stable rest position to a spring-loading position, while said lever is operatively connected to a unit which delays its return movement to its stable rest position, and is provided with release means co-operating with detent means of a pusher which is retained by the latter means in a pre-load position of an actuating spring and which is designed to depress the associated pushbutton in a direction to open or unlock the retaining catch when the loading lever has reached again its stable rest position upon its angular return displacement.

The particular mechanical construction and the remarkably constructional simplicity of the device according to the invention ensure an extremely reliable operation, with reduction of costs. Moreover, the device according to the invention permits the safety belt to be effectively released automatically in any case when the passenger cannot effect this operation by himself. In case of a relatively rapid succession of impacts, the device according to the invention avoids an immediate release after the first impact, and keeps the passenger fastened during a pre-established period of time in view of a possible successive impact, and the belt is automatically released only if, after this delay period, no further impact has occurred. This ensures the utmost safety for a passenger, for example, in case of consecutive bumpings or rolling over of a vehicle, where a rapid succession of impacts occurs.

The invention also provides additional characteristics which further improve said device and which form the subject matter of the sub-claims.

BRIEF DESCRIPTION OF THE DRAWINGS

The particular characteristics of the invention and the advantages resulting therefrom will appear with more details from the description of a preferred embodiment, shown as a non-limiting example in the accompanying drawings, wherein:

FIG. 2 is a longitudinal sectional view on the line II—II of FIG. 1;

FIG. 3 is a cross sectional view of the device of FIGS. 1 and 2;

FIG. 5 is a view similar to FIG. 1 of the device in its loaded position after an impact.

DESCRIPTION OF THE PREFERRED EMBODIMENTS

Figure 1:
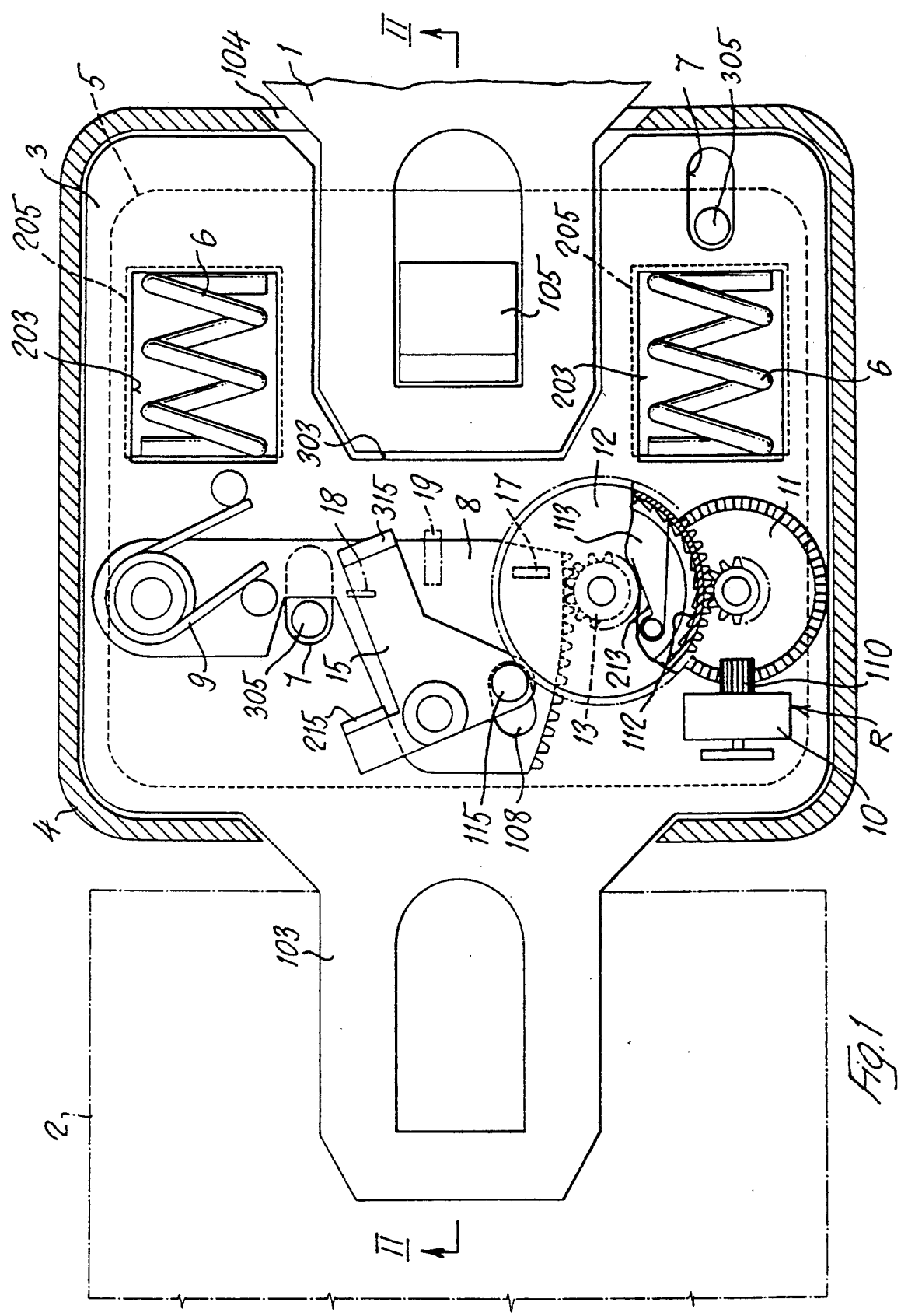
FIG. 1 is a top plan view of the device according to the invention.

According to the Figures, the device of the invention is designed to be arranged between the locking buckle 1 of a seat belt and the retaining catch 2 for said locking buckle 1, which is secured to the vehicle frame.

The device comprises a box 4 divided into two semi-shells substantially along a plane which is defined by the locking buckle 1 of the belt. At one side, it is provided with a slit for introducing the locking buckle 1 of the belt thereinto, while protruding from the opposite side of the box 4 is a means for interlocking said device to the retaining catch 2, and the head surface of a pusher.

As described below with more detail, the pusher 16 is constructed so that, after an impact, said pusher 16 snaps against the opening pushbutton 102 of the retaining catch 2, thus causing the release of said device, which is engaged as a terminal with the locking buckle 1 of the belt.

One of said semi-shells of the box 4 accommodates a first stationary plate 3 and a second plate 5, said plates being superimposed on each other.

The first stationary plate 3 comprises, on the side facing the retaining catch 2, an extension 103 designed to interlock with said catch and having a configuration which is substantially identical to that of the locking buckle 1 of the belt. The opposite side of the stationary plate 3 is formed with a recess 303 having a configuration which is complementary to the locking buckle 1 of the belt. The second plate 5 is supported on the first plate 3 so as to be slidable in both senses, in a direction for the device to become engaged with the retaining catch 2, said plate 5 being guided by bolts 305 protruding through elongated guide slots 7 formed in the first stationary plate 3 and orientated in a direction for mutual sliding movement of both plates. At the region associated with the recess 303 in the first stationary plate 3, the second slidable plate 5 comprises a detent dog 105 preferably integral therewith and consituting a part of a mechanism for retaining the locking buckle 1 of the belt in the device. Said two plates 3 and 5 are held resiliently in a pre-established stable rest position by two springs 6 which are engaged within slots 203, 205 in the two plates 3 and 5. The slots 203, 205 in the two plates 3 and 5 coincide when in the stable rest position and are provided in the regions at both sides of the recess 303 in the first stationary plate 3.

On the first stationary plate 3, on the side away from the sliding plate 5, there is pivotably fulcrumed parallelly to said plate 3 a lever 8 for loading a spring 9. The spring 9 is interposed between the loading lever 8 and the plate 3 so as to be loaded by an angular displacement of the lever 8 in a direction away from the retaining catch 2, from a stable rest position of the loading lever 8 to an unstable position thereof when the spring 9 is loaded (FIGS. 1, 5). The side of the loading lever 8 that faces the retaining catch 2 co-operates with a pushing pin constituted by one of the guide pins 305 of the slidable plate 5 whereby, upon the mutual sliding movement of the plate 5 with respect to the stationary plate 3 in a direction away from the retaining catch 2, the lever 8 is displaced from its stable rest position (FIG. 1) to its unstable position where it has loaded the spring 9 (FIG. 5).

The free end portion of the loading lever 8 is of toothed configuration and it meshes with a pinion 13 which forms a part of the time-delaying means indicated generally at R (see particularly FIG. 3). Thanks to the time-delaying means R, when the two plates 3 and 5 have moved back to their stable rest position, thus permitting the return movement of the lever 8, this return movement of the lever 8 from its unstable position where it has charged the spring 9 (FIG. 5) to its stable rest position (FIG. 1) is slowed down by a pre-established extent. Unlike the plates 3 and 5, therefore, the lever 8 does not snap back immediately to its stable rest position, but rather it is obliged to reach it always through the same pre-established period of time.

As it can be seen particularly in FIG. 3, in this exemplary embodiment, the delaying mechanism is of the mechanical type and it consists of a brake 10, for example, a brake of the magnetic type. A pinion 110 of the magnetic brake 10 meshes with a first toothed wheel 11 which, in turn, meshes with a second toothed wheel 12. The toothed wheel 12 is operatively connected to a pinion 13 which is in mesh with the free end of the lever 8 by means of a unidirectional coupling means permitting the operative connection of the lever 8 with the brake 10 only during its return movement from the unstable spring-loaded position to the stable rest position. Specifically, the pinion 13 and the toothed wheel 12 are co-axial with each other. On its side facing the toothed wheel 12, the pinion 13 carries a disc 113, while the associated side of the toothed wheel 12 is formed with an internally toothed crown 112 (FIG. 1). On the disc 113 of the pinion 13 there is mounted a small coupling spring 213 which co-operates with the ratchet teeth of said toothed crown 112 so that, in case of relative rotation of the pinion 13 with respect to the toothed wheel 12 corresponding to the displacement of the lever 8 from its stable rest position to its spring-loaded position, said coupling spring 213 slides freely along the toothed crown 112 whereas, in case of opposite relative rotation of the pinion 13 with respect to the toothed wheel 12, said coupling spring becomes engaged against one of the teeth of the crown 112, thus coupling operatively said two elements and, therefore, the lever 8 with the brake 10.

The lever 8 carries a means for releasing the pusher 16, said means comprising a release lever 15 which is fulcrumed on said lever 8 and is of T-shape. It can oscillate about an axis which is normal to the lever 8, between two relative end positions with respect to the lever 8. In the rest position of the lever 8, the T-shaped release lever 15 is angularly disposed with the stem of the "T" directed towards the fulcrum of the lever 8 and in the spring-loaded position it moves to a position orthogonal to the lever 8 (FIGS. 1 and 5). The oscillation of the release lever 15 between its two relative positions with respect to the lever 8 is controlled by two abutment projections 115 and 215 arranged, respectively, at the ends of the transverse arms of the "T". One of the abutment projections (115) is arranged at the end of the transverse arm of the T that is associated with the free end of the lever 8 and it co-operates with a small abutment rib 17 which is secured to the first stationary plate 3, thus causing the stem of the T to be re-aligned orthogonally to the lever 8 upon the displacement of the lever 8 to the position where it has loaded the spring 9. Said abutment projection 115 extends to the region including the small rib 17 through an arcuated slot 108 in the lever 8. The other abutment projection 215 is provided at the opposite end of the transverse arms of the T and it extends towards the pusher 16 which is provided with a projection 18 consisting, preferably, of a resilient tab. During the final portion of the stroke of said pusher 16, its projection 18 co-operates with the projection 215, thus displacing the release lever 15 to the angular position with the stem of the T directed towards the fulcrum of the lever 8 (FIG. 5).

The free end of the stem of the release lever 15 is provided with a release tooth 315 extending towards the pusher 16 and intended to co-operate with the end of an angular pawl 19, particularly when during its return movement the loading lever 8 has arrived again in proximity of its stable rest position.

The angular pawl 19 is accommodated in a slot 220 of a support plate 20 which is accommodated in the semi-shell of the box 4, which is opposite to that accommodating the plates 3 and 5. The pawl 19 is fulcrumed at its angle region so as to be pivotable about a horizontal axis transverse to the direction of movement of the plate 5 on a lug 120 integral with the plate 20. The angular pawl 19 comprises an end portion provided with a detent dog 119 which is urged constantly against the wall of the pusher 16 by a spring 21 arranged between the pawl section that is associated with the release tooth 315 of the release lever 15 and said support plate 20. In the retracted position of the pusher 16, the detent dog 119 of the angular pawl 19 is engaged in a corresponding slot 116 of the pusher 16 and retains the pusher in said position. During the return movement of the loading lever 8, the angular pawl may be displaced against the action of the spring 21 by the release tooth 315 of the release lever 15, thus disengaging from the associated slot 116 in the pusher 16 and releasing said pusher.

Figure 4:
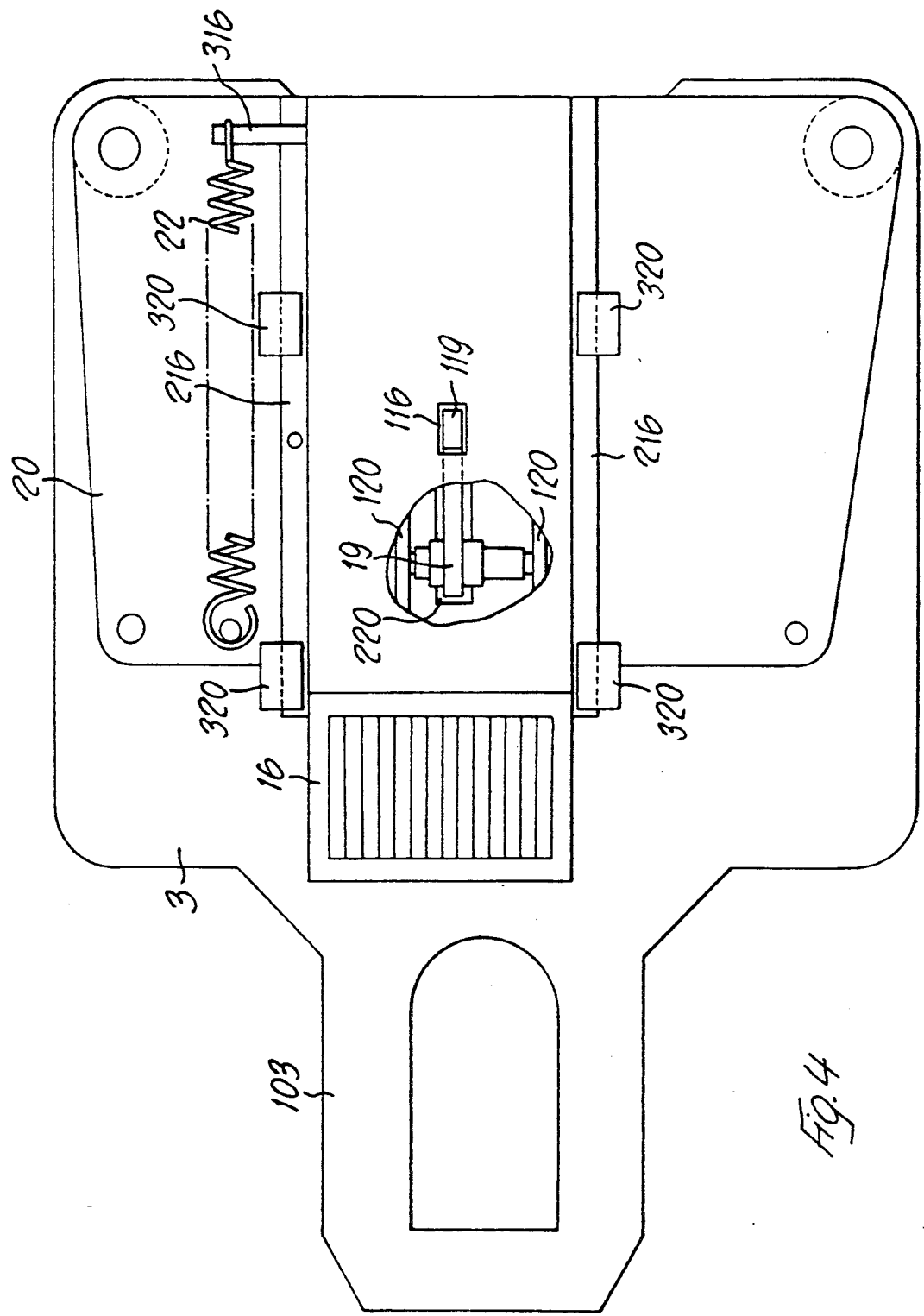
FIG. 4 is a top plan and partly sectional view of the pusher of the device according to the FIGS. 1 and 2.

As appearing particularly from FIG. 4, the pusher 16 is mounted slidably on the support plate 20 thanks to a pair of side ribs 216, each of which is engaged in a pair of channel-shaped guide protrusions 320 on the plate 20. The pusher 16 is substantially in line with the opening pushbutton 102 of the retaining catch 2 and is so sized as to co-operate only with the head surface of said pushbutton without contacting the remaining stationary portions of the retaining catch 2. The pusher 16 is actuated by a spring 22 which is loaded in the retracted position thereof. The spring 22 is fixed at one end to the plate 20 and at the other end to a protrusion 316 of said pusher.

The operation of the device according to this exemplary embodiment is extremely simple. The device is initially in the condition shown substantially in the FIGS. 1 and 2, wherein the two plates 3 and 5 and the loading lever 8 are in their stable rest position, the stem of the T of the release lever 15 is directed towards the fulcrum of the lever 8 and the pusher 16 is held in its retracted position by the pawl 19, while the release tooth 315 is downstream of the associated end portion of the pawl 19 referring to the direction of movement of the pusher 16.

Upon an impact, the seat belt is submitted to traction, thus causing the plate 5 to slide relatively to the stationary plate 3. Due to this, the loading lever is moved to a position whereby the spring 9 is loaded, while during said movement the associated release lever 15 is re-positioned orthogonally to said lever 8. This angular re-positioning of the release lever 15 causes the release tooth 315 to move nearer the associated end of the pawl 19 (FIG. 5). Immediately after the impact, the plates 3 and 5 move back to their stable rest position, while the return movement of the loading lever 8 to its stable rest position is braked by the time-delaying means R, i.e. by the brake 10, so that it requires a pre-established time to reach said stable rest position. During the return movement of the loading lever 8, due to the relative approaching movement between the release tooth 315 of the release lever 15 and the pawl 19 as a result of the oscillation of said lever to its position orthogonal to the lever 8, said release tooth 315 is moved to co-operate with the pawl 19 in the final stretch of the return stroke of the loading lever 8 to its stable rest position. As a consequence, the detent dog 119 of the pawl 19 is disengaged from the associated slot 116 in the pusher 16, thus causing the displacement of the pusher 16 against the pushbutton 102 of the retaining catch 2 and, therefore, the release of the device and the seat belt.

During the movement of the pusher 16 against the opening pushbutton 102 of the retaining catch 2, the projection 18 of the pusher 16 will abut against the stop projection 215 of the release lever 15 to move it back to its angular position directed towards the fulcrum of the lever 8 associated to the stable rest position of said loading lever 8. Advantageously, this causes the release tooth 315 of the release lever 15 to move away from the associated end of the pawl 19 whereby when the pusher is moved again to its retracted position, the detent dog 119 of the pawl can become engaged in the slot 116.

As described above, the loading lever 8 requires a pre-established period of time to move to the position wherein it activates the pusher 16, which is provided in proximity of its stable rest position and wherein the release tooth 315 acts on the pawl 19 to unlock the pusher 16. During this period of time, the seat belt is held firmly engaged in the retaining catch 2. In case of a successive impact, or of a series of successive impacts which are spaced from each other, respectively, by a time interval which is shorter than required to unlock the pusher 16, the passenger will be held fastened by the safety belt, while each impact of said series causes a new displacement of the loading lever 8 to its spring-loading position. Therefore, each impact of said series causes a new countdown to start from the beginning of the interval required to release the belt, thus avoiding any danger for the passenger.

The time interval between an impact and the release of the seat belt may be set of any duration upon the design step. In this circumstance, it is advantageous to regulate the brake 10 so as to obtain a delay time between 6 and 10 seconds.

Therefore, the invention provides an automatic release device of the seat belt, which grants the passenger the utmost safety even in case of a plurality of successive impacts. The above is obtained by means of a construction of mechanical type which, in addition to the economical advantages, is very sturdy, scarcely liable to damages and malfunctions and, therefore, extremely reliable and safe in operation.

I claim:

1. An automatic release device for use with a seat belt on a motor vehicle or the like where the seat belt has a locking buckle and a retaining catch for securely retaining the locking buckle and for releasing the locking buckle when an unlocking pushbutton is pushed, said automatic release device being interposed between the locking buckle and the retaining catch and comprising:
    a retaining means at one side for securely retaining the locking buckle of the seat belt to said automatic release device;
    a substitute locking buckle at an opposite side from said retaining means which securely retained by the retaining catch of the seat belt in place of the locking buckle of the seat belt which is retained by said retaining means such that actuation of the unlocking pushbutton causes the retaining catch to release said substitute locking buckle and hence said automatic release device together with the locking buckle of the seat belt secured to said automatic release device;
    a pushbutton actuating means for pushing the pushbutton of the retaining catch; and
    a timing means which is actuated by an impact for actuating said pushbutton actuating means to push the pushbutton after a pre-established period of time from the impact.

2. An automatic release device as claimed in claim 1 wherein said timing means includes a resetting means for resetting the pre-established period of time of said timing means whenever a further impact occurs before the pre-established period of time has expired from a previous impact.

3. An automatic release device as claimed in claim 2 and further including a box in which said retaining means, said pushbutton actuating means and said timing means are housed; and wherein said pushbutton actuating means includes a pusher slidably mounted in said box between a retracted position inside of said box and an extended position where said pusher engages the unlocking pushbutton to release said substitute locking buckle, a loaded spring which biases said pusher toward the extended position from the retracted position, and a locking means for locking said pusher in the retracted position while being biased by said loaded spring and for being actuated by said timing means to release said pusher after the pre-established period of time.

4. An automatic release device as claimed in claim 3 wherein said timing means includes a resilient means for powering said timing means and a loading means for loading said resilient means using a force of the impact.

5. An automatic release device as claimed in claim 4 wherein said loading means includes a first plate dynamically connected with said substitute locking buckle in said box, a second plate dynamically connected with said retaining means and slidably guided on said first plate between a rest position and a tractive position which results from a force of impact on the locking buckle of the seat belt, and a second resilient means provided between said first plate and said second plate for returning said second plate to the rest position relative to said first plate.

6. An automatic release device as claimed in claim 5 wherein said timing means includes a loading lever which is fulcrumed to said first plate and operatively connected with said first-mentioned resilient means, and a dragging pin which is secured to said second plate such that, when said second plate is moved to the tractive position, said loading lever is moved by said dragging pin from a stable position to an unstable position biased by said first-mentioned resilient means and said dragging pin then returns with said second plate to the rest position.

7. An automatic release device as claimed in claim 6 wherein said timing means further includes a brake, a free end of said loading lever, and a unidirectional coupling means for operatively connecting said free end of said loading lever to said brake such that said loading lever is disconnected from said brake during a displacement of said loading lever from the stable position to the tractive position and connected to said brake during a return from the tractive position to the stable position.

8. An automatic release device as claimed in claim 7 wherein said free end of said loading lever includes a toothed configuration; wherein said coupling means includes a pinion which meshes with said toothed configuration of said free end of said loading lever, a disc extending from said pinion, a small coupling spring secured to said disc, and a gearwheel coaxial with said pinion and operatively connected with said brake having a crown provided with ratchet teeth which said ratchet teeth cooperate with said coupling spring.

9. An automatic release device as claimed in claim 8 wherein said brake is a magnetic brake.

10. An automatic release device as claimed in claim 6 wherein said loading lever includes a small release lever which cooperates with said locking means during the movement of said loading lever from the unstable position to the stable position to release said pusher after the pre-established period of time.

11. An automatic release device as claimed in claim 10 wherein said locking means includes a slot in said pusher, a pawl which is pivotable about an axis transverse to a direction of movement of said pusher and which includes a detent dog which engages said slot when said pawl is in a retracted position, and a spring for urging said detent dog of said pawl into said slot.

12. An automatic release device as claimed in claim 11 wherein said release lever includes a release tooth which engages said pawl as said loading lever is moved from the unstable position to the stable position whereby said detent dog is disengaged from said slot in said pusher.

13. An automatic release device as claimed in claim 12 wherein said release lever has a T-shape comprising a stem and two transverse arms, said release lever is fulcrumed to said loading lever at a central region of said two transverse arms, said release tooth is provided at an end of said stem, a first abutment projection is provided at an end of one of said arms, and a second abutment projection is provided at an end of the other one of said arms; wherein said second plate includes a rib which cooperates with said first abutment such that, as said loading lever is moved from the stable position to the unstable position, said release lever is angularly displaced to a position where said stem is aligned with the direction of movement of said pusher and said release tooth is thereby aligned for engagement with said pawl as said loading lever is moved from the unstable position to the stable position; and wherein said pusher includes a resilient tab which cooperates with said second abutment such that, as said pusher is moved from the retracted position to the extended position, said release lever is angularly displaced to an initial position where said release tooth is not aligned for engagement with said pawl as said loading lever is moved from the stable position to the unstable position.

14. An automatic release device as claimed in claim 6 wherein said resetting means causes, during a subsequent impact occurring as said loading lever is moving from the unstable position to the stable position, said loading lever to be returned to said unstable position.

15. An automatic release device as claimed in claim 6 and further including a brake means for allowing the movement of said loading lever from the unstable position to the stable position in a time period of 6 to 10 seconds.

* * * * *